(No Model.)

J. H. SMITH & E. P. WAGOR.
FURROW OPENER FOR SEED DRILLS.

No. 566,875. Patented Sept. 1, 1896.

Witnesses
Jos. H. Blackwood
Albert B. Blackwood.

Inventor
John H. Smith
Esco P. Wagor
by David A. Gourick
Attorney

UNITED STATES PATENT OFFICE.

JOHN H. SMITH AND ESCO P. WAGOR, OF SHELDON, NORTH DAKOTA.

FURROW-OPENER FOR SEED-DRILLS.

SPECIFICATION forming part of Letters Patent No. 566,875, dated September 1, 1896.

Application filed April 4, 1896. Serial No. 586,219. (No model.)

*To all whom it may concern:*

Be it known that we, JOHN H. SMITH and ESCO P. WAGOR, citizens of the United States, and residents of Sheldon, in the county of Ransom and State of North Dakota, have invented certain new and useful Improvements in Furrow-Openers for Seed-Drills, of which the following is a specification.

Our invention relates to seed-drills, and more particularly to improvements in furrow-openers therewith, their construction, and the manner of mounting them in a supporting-frame, and has for its object to provide a rolling furrow-opener placed in front of the seed-tube through which the grain passes from the hopper into the furrow thus formed.

A further object of our invention is to provide a furrow-opener that will readily cut weeds, stalks, straw, or other like obstructions which may litter the field being planted, and which will, when used in a seeder or planter, be of light draft.

A further object is to provide a rolling furrow-opener of light weight, great strength, and simple construction, which can be easily kept sharp on its cutting edge and be readily removed from the frame in which it is mounted.

A still further object is to provide furrow-openers which may be attached to a seeder or seed-planter in such manner and by such means that they will operate so far independently of each other, as regards the furrow made, as to deposit the grain at a uniform depth.

These objects we accomplish in the manner and by the means hereinafter more specifically pointed out and described in detail, reference being made to the accompanying drawings, in which the same numerals refer to like parts in all the figures of the drawings.

Figure 1:
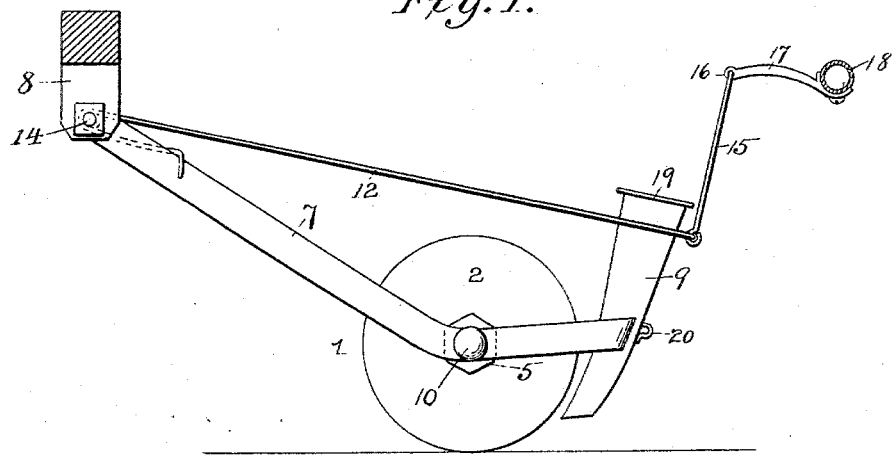
Figure 2:
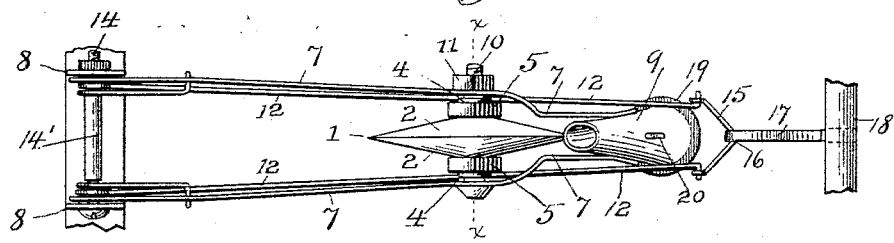
Figure 3:
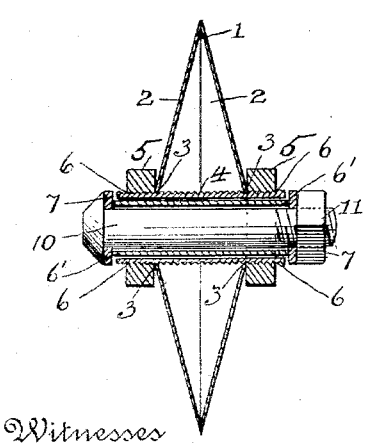
Figures 4, 5:
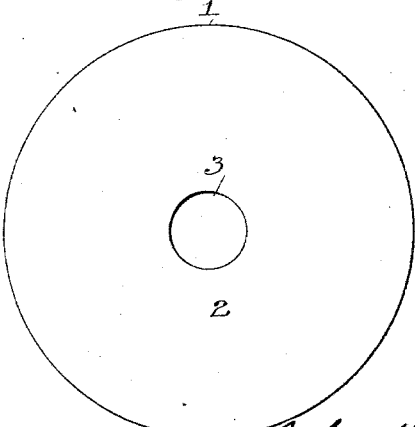

Figure 1 is a side elevation of our improved rolling furrow-opener, showing cross-sections of the beam and rock-shaft of a grain drill or planter to which it is attached. Fig. 2 is a bottom plan view. Fig. 3 is an enlarged cross-section of our rolling furrow-opener on the line X X, Fig. 2. Fig. 4 is a side view, and Fig. 5 a cross-section, of one of the disks forming our improved furrow-opener.

In carrying out our invention we construct a furrow-opener 1 of disks 2 of sheet-steel of suitable thickness and of sufficient diameter. These steel disks 2 are cut as nearly in the form of a circle as possible and are concaved and a circular aperture 3 made in the center of each. The margin of the face of the concave side of the disk is ground down, so that when two such surfaces are brought in contact they will form a continuous joint. Two such disks, when thus fitted to each other, are held together on a sleeve 4 by means of nuts 5, fitting on the sleeve. These disks are so concaved in relation to their diameter that when their concave faces are placed together their convex surfaces will taper gradually and uniformly to the periphery of the furrow opener or cutter thus formed, thereby forming a cutting edge that will cut into the ground easily to any desired depth for planting seed. The sleeve 4 is cylindrical and fills the aperture 3 in the disks when placed therein. The outer surface of the sleeve is provided with right and left threads 6, and have fitted thereto nuts 5, which are correspondingly threaded. When the sleeve 4 is inserted in the aperture 3 and the nuts 5 are tightened on the sides of the disks, the margins of the concave faces are brought together with such uniformity that a continuous cutting edge is formed on the outer circumference.

The margins of the faces of the disks 2 may be brazed or welded together, but we prefer to construct the furrow-opener in the manner described. When so constructed, the wear of the cutting circumference may be readily taken up by retightening the nuts 5 on the sleeve.

Any suitable means may be employed to sharpen the furrow-opener if it is desired to give it a sharper edge than it would have when put together as described. As thus constructed, the furrow-opener 1 also performs the work of a cutter when mounted in the seeder.

Within the sleeve 4 is placed a second sleeve 6', which fits snugly therein. This sleeve 6' is made a little longer than the sleeve 4, and revolves in it. Two arms 7 are hinged by a rod 14 at their front ends between the ends of two downwardly-projecting brackets 8, attached to the frame of the seeder or grain-planter and are held apart on the rod 14 by a sleeve 14'. These arms 7 are straight for about two-thirds of their length, and then curve slightly upward, as shown in Fig. 1, and their rear ends are rigidly fixed on opposite sides of the seed-tube 9 at a point below the middle of said tube, holding the lower end of the drill 9 high enough to prevent it coming in contact with the earth when the furrow-opener is mounted in front thereof, between the arms 7, on a bolt or axle 10, provided with a head on one end and threaded at the other end, and having a nut 11 fitting thereon, whereby said arms 7 may be brought into contact with the ends of the sleeve 6' and hold it in a rigid position for sleeve 4 to revolve upon.

A pair of spring-pressure arms 12 extend back to the rear of the seed-tube 9 and on each side thereof, the rear end of each arm being turned outward at a right angle and having its front end coiled around the rod 14 and held apart thereon by a sleeve 14' between the arms 7, over which the extreme ends are hooked. Hooked to the rear ends of the said pressure-arms 12 is a yoke or bail 15, which is attached at its upper end 16 to the end of an arm 17, rigidly fixed at its opposite end to a rock-shaft 18, journaled at its ends to supports in the rear of the hopper.

The seed-tube 9 is provided with an annular flange 19, formed at the top thereof and extending outward at a right angle thereto. When the rock-shaft is rotated backward, the arms of the pressure-spring 12 come in contact with the flange 19, whereby the furrow-opener may be raised or lowered. An eye 20 is formed on the rear side of the seed-tube 9, to which may be attached chain coverers, or any suitable device for closing the furrow.

Having thus described our invention, what we claim as new, and desire to secure by Letters Patent, is—

1. A rolling furrow-opener gradually converging on each side to a cutting edge at its circumference formed of convexo-concave disks of sheets or plates of metal, the margin of their concave faces formed with plane angles and fitted to each other, said disks concentrically apertured and held rigidly together on a sleeve passing through said aperture by means of nuts fitted on said sleeve at each end thereof, substantially as shown and described.

2. The combination in a grain-drill provided with suitable means for dropping grain therefrom, of a rolling furrow-opener formed with a cutting circumference and mounted on a journal fixed between arms or side bars hinged at their forward ends between brackets rigidly fixed to said grain-drill frame said arms having fixed thereto immediately in the rear of said furrow-opener a seed-tube the lower end of which terminates above the furrow made by said opener substantially as shown and described.

3. In a seeder or planter, the combination with a seeder or planter provided with a hopper for carrying the seed and means for dropping it therefrom, of a rolling furrow-opener mounted on a journal rigidly fixed between arms hinged at their forward ends to supports in said seeder, a seed-tube fixed between the ends of said arms immediately at the rear of the circumference of said furrow-opener, the end of said tube terminating directly over the furrow made by said opener, pressure-springs coiled over and around the rod to which said arms are hinged, their short ends fixed to each of said arms and having their rear ends yoked to an arm, rigidly attached to a rock-shaft, substantially as shown and described.

4. An attachment for seeders and planters consisting of a rolling furrow-opener converging to a cutting edge at its circumference formed of convexo-concave sheets or plates of metal, the margins of the concave faces thereof fitted to each other, said disks concentrically apertured and held together on a cylindrical sleeve passing therethrough and having right threads on one of its ends and left threads on the opposite end and nuts fitted thereon, said furrow-opener mounted and revolving between arms or bars on a journal fixed between said arms or bars, said arms or bars carrying a seed-tube between their ends in rear of said furrow-opener, means for hinging said arms to a seeder or planter frame for regulating the cutting depth of said furrow-opener, substantially as shown and described.

5. In a grain drill or planter, the combination with a drill or planter provided with a receptacle for holding seed and having means for dropping it therefrom, of a rolling furrow-opener having convex sides and formed of concave sheets of metal concentrically mounted on a cylindrical sleeve and rigidly held together thereon by means of nuts fitted to threads on said sleeve, said sleeve revolving on a journal rigidly held in position between bars hinged at their forward ends to brackets fixed to the frame of the drill, said bars rigidly fixed to a seed-tube and supporting said tube immediately in the rear of said furrow-opener, substantially as shown and described.

6. In a seeder or planter, the combination with a receptacle for holding grain and means of dropping it therefrom, of a rolling furrow-opener 1 formed of convexo-concave disks, the margins of the concave faces thereof fitted to each other, said furrow-opener concentrically mounted on a cylindrical sleeve 4 and held thereon by nuts, said sleeve revolving on a journal 6 between arms 7 hinged at their forward ends to brackets 8 and carrying immediately in the rear of said furrow-opener a seed-tube 9 abruptly flanged at its top end, its opposite end terminating at a distance above the lower circumference of said furrow-opener, pressure-springs formed of arms 12 coiled at their forward ends over and around the rod 14 by which said arms 7 are hinged between brackets 8 and held apart thereon by a sleeve 14' and passing back a distance with their rear ends hooked over said arms 7, and the other ends of said pressure-springs carried back and resting on each side of said tube 9 and having hitched to their ends a yoke 15 connected at its upper end to an arm 17 fixed to a rock-shaft 18, substantially as shown and described.

In testimony whereof we hereto affix our signatures in the presence of two witnesses.

JOHN H. SMITH.
ESCO P. WAGOR.

Witnesses:
J. E. McCARTHY,
ED PIERCE.